United States Patent [19]

Ruppert

[11] Patent Number: 4,580,982
[45] Date of Patent: Apr. 8, 1986

[54] EJECTION SEAT SIMULATOR

[76] Inventor: Robert W. Ruppert, 15 Kitchell Rd., Convent Station, N.J. 07961

[21] Appl. No.: 618,231

[22] Filed: Jun. 7, 1984

[51] Int. Cl.⁴ .............................................. G09B 9/00
[52] U.S. Cl. .................................................... 434/30
[58] Field of Search ...................... 434/30, 45, 46, 55, 434/56, 57; 244/122 A, 122 AE, 122 AF, 122 AG, 122 AH; 272/1 C, 31 A, 17, 18

[56] References Cited

U.S. PATENT DOCUMENTS

| 2,467,764 | 4/1949 | Martin | 244/122 A X |
| 2,627,675 | 2/1953 | Kittredge | 434/45 |
| 3,026,632 | 3/1962 | Eisenberg | 434/30 |
| 3,191,892 | 6/1965 | Fuller et al. | 244/122 AE |
| 3,286,373 | 11/1966 | Mangieri | 434/30 |
| 3,378,939 | 4/1968 | Carey et al. | 434/30 |

Primary Examiner—William H. Grieb
Attorney, Agent, or Firm—Kenyon & Kenyon

[57] ABSTRACT

The ejection seat simulator is made with a cockpit which can be moved away from a seat so as to provide access to the seat in cases of accident or in cases where repairs are required.

The throttle and pull ring are connected with suitable electronic electrical lines which can lead back to the control panel when the cockpit is moved away from the seat. In this regard, the lead lines are long enough so as to permit a desired extent of movement of the cockpit 18.

11 Claims, 6 Drawing Figures

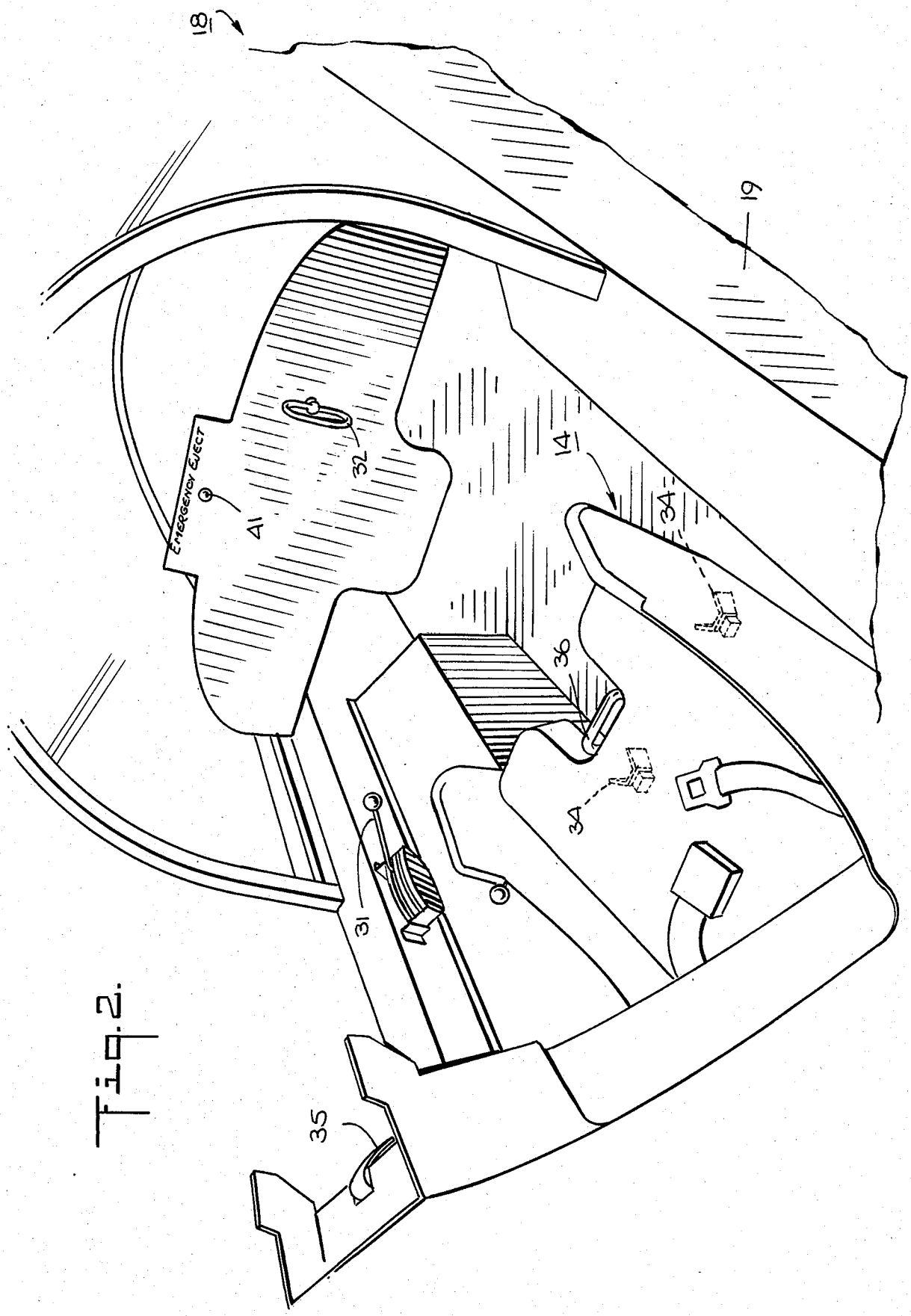

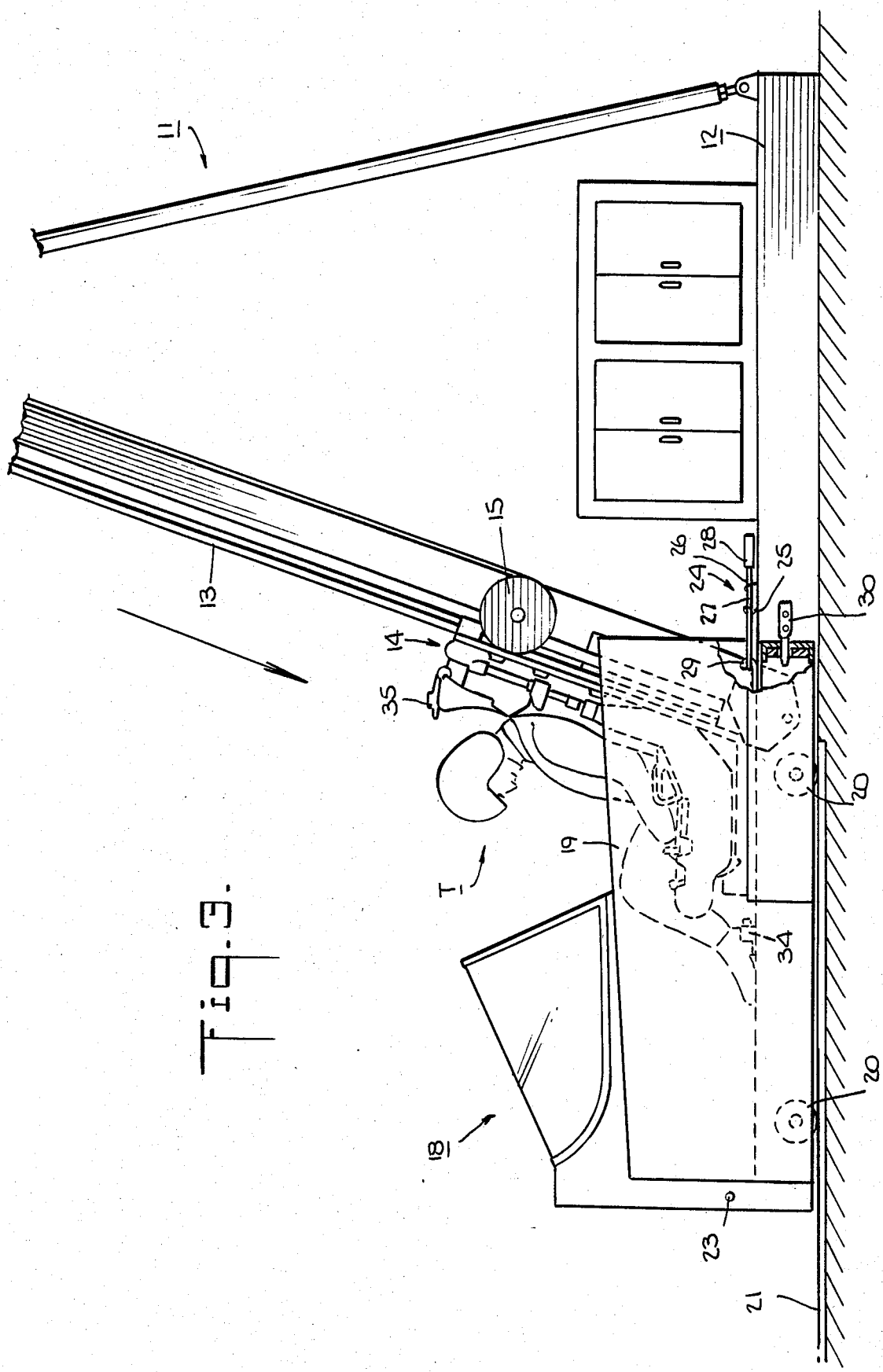

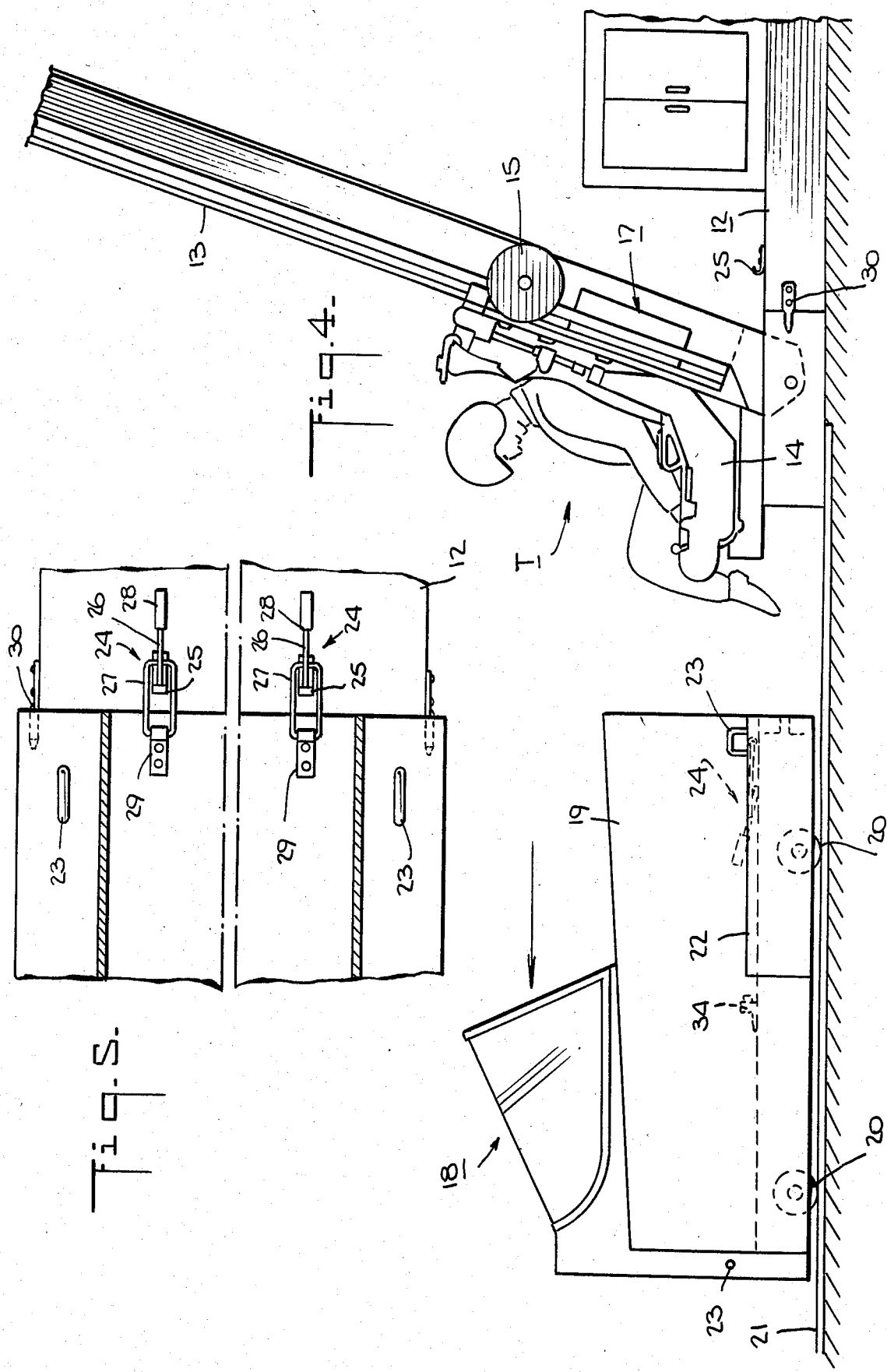

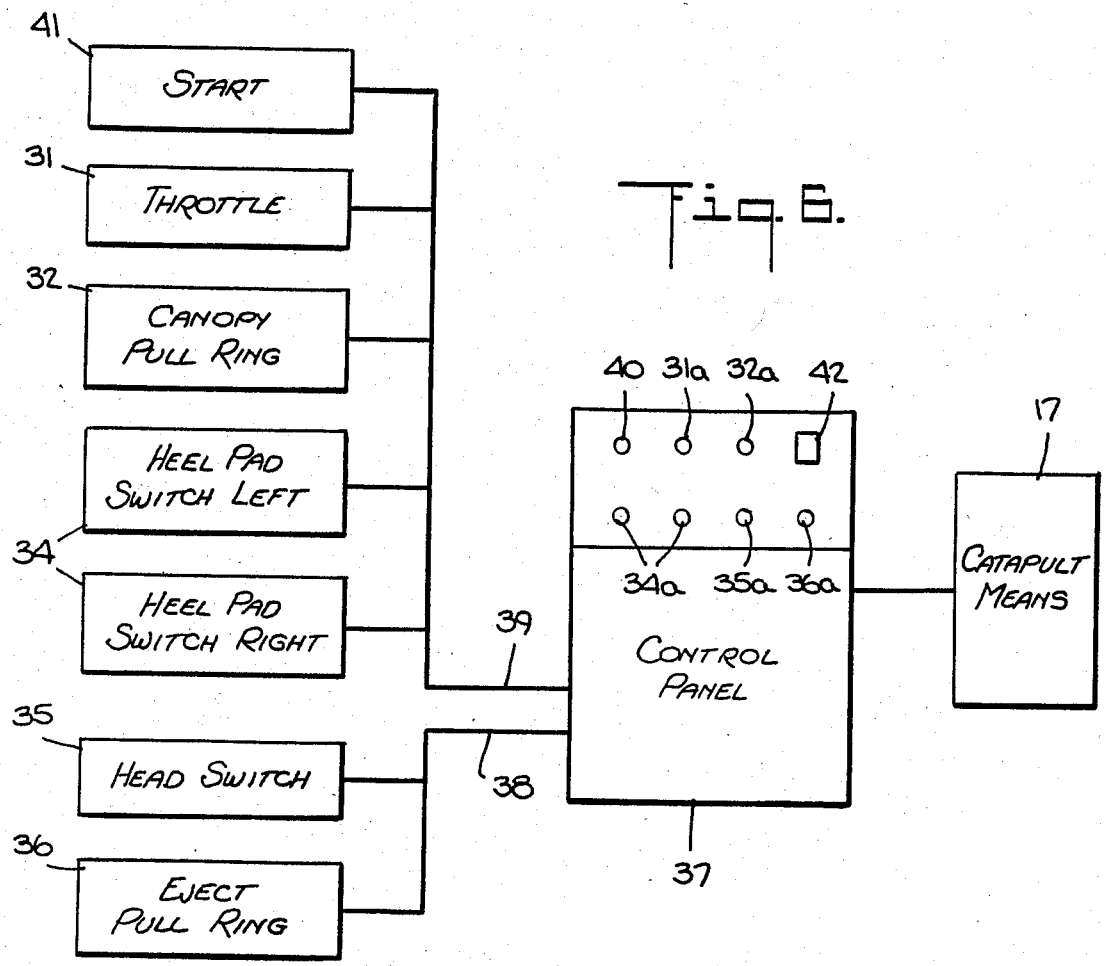

EJECTION SEAT SIMULATOR

This invention relates to an ejection seat simulator.

As is known, various types of ejection seat simulators have been used for the training of pilots of jet aircraft. Generally, the simulators have been constructed to provide training for flight crew members, for example, in the procedures for ejection from an aircraft as well as training in being subjected to the large gravitational forces imposed upon the body during ejection from an aircraft. In some cases, the simulators have been constructed in a manner as described in U.S. Pat. No. 2,467,764 wherein a seat is mounted for movement along a test rig guide. In other cases, for example as identified by the Naval Training Equipment Center as a Universal Ejection Seat Trainer, Device 9E6 and sold by Burtek, Inc., the known simulators have been constructed with a cockpit arrangement in which a seat is disposed with an upstanding tower having track means along which the seat can be catapulted from the cockpit.

Because of the high inertial forces imposed upon the body of a seat occupant, various precautions are usually required in order to properly position the occupant for ejection from a cockpit arrangement. However, despite the various precautions which may be taken, accidents may sometimes occur. For example, if an occupant is not seated properly, there is a risk that the occupant can be injured upon ejection of the seat from the cockpit. In such cases, a need arises to remove the occupant from within the cockpit after the ejected seat has been returned to a rest position within the cockpit. In the past, the cockpit arrangements have usually been of such fixed-in-place constructions that access to a seated occupant cannot be readily obtained, particularly if the occupant has to be carefully removed for medical reasons. Further, in some cases, the cockpit arrangements have been at elevated positions above ground level which further encumber ready access to a seated occupant particularly where medical equipment, such as a gurney or mobile emergency vehicle, cannot be readily brought alongside the seated occupant. Further, should it become necessary to change the seat from time to time depending upon the type of aircraft being simulated, cumbersome operations have been required in order to remove one seat from a cockpit for replacement by another seat or to repair a seat.

Accordingly, it is an object of this invention to provide an ejection seat simulator which is constructed to provide an unencumbered access to a seated occupant should an accident occur.

It is another object of the invention to permit simple operations to be carried out to change, modify or repair the seat of an ejection seat simulator.

It is another object of the invention to provide access to a seated occupant of an ejection seat simulator at ground level.

It is another object of the invention to provide an ejection seat simulator of relatively simple construction which can be readily used in the training of flight crew members in ejection procedures.

It is another object of the invention to provide means to readily replace one cockpit arrangement with another to simulate a variety of aircraft.

Briefly, the invention provides an ejection seat simulator which is comprised of a tower having a support and track means which extend upwardly from the support, a seat which is movably mounted on the track means for movement therealong and means for propelling the seat along the track means. In addition, a cockpit is releasably connected to the support with the cockpit being movable between a first position adjacent the support and enveloping the seat and a second position spaced from the support and the seat in order to provide access space to the seat.

Further, means are provided in the cockpit for simulating a sequence of ejection procedures while means are provided at the seat for actuating the means for propelling the seat along the tower track means upon completion of the sequence of ejection procedures. An electrical control panel is also connected to the means in the cockpit and the means at the seat in order to receive signals therefrom. The panel is further connected to the means for propelling the seat so as to actuate this means in response to the reception of the signals from the means in the cockpit and on the seat.

The means which are provided in the cockpit for simulating certain ejection procedures may include a dummy throttle for simulating a deceleration of speed as well as a pull ring for simulating the ejection of a canopy. A suitable signal means may also be provided in the cockpit for indicating a starting time for this latter sequence of procedures to start.

In order to releasably connect the cockpit to the tower support, a pair of alignment pins are provided on the support to be slidably received within mating openings in the cockpit. In this respect, the cockpit may be mounted via rollers on rails which are embedded in a concrete floor adjacent to the tower support. Thus, the cockpit can be rolled towards and away from the tower support when required. Suitable means may also be provided to releasably lock the cockpit to the tower support. For example, such means may include an upstanding hook on the support and a releasable latch mounted on a rear of the cockpit in order to engage with the hook.

The means at the seat for actuating the seat propelling means may include heel pad switches which are activated by the heels of a seated occupant so as to indicate that the feet of the occupant are in a predetermined position. In addition, a suitable switch may be positioned near the head area of an occupant so as to emit a signal indicating that the occupant's head has been positioned in a predetermined position. In addition, means in the form of a pull ring, i.e. a D-ring, is positioned in the seat so that when pulled by the trainee, the catapulting means can be actuated to eject the seat. Alternatively, a face curtain can be used instead of a D-ring for this purpose.

The simulator is constructed so that the cockpit is mounted at ground level so that a trainee can either climb over a side of the cockpit into the seat or can be seated with the cockpit spaced away from the seat. In either case, with the trainee seated on the seat and the cockpit secured to the tower, the trainee can then run through a sequence of procedures to effect ejection. For example, in response to the signal means in the cockpit indicating that the ejection procedure is to start, the trainee would first grasp the dummy throttle to simulate a deceleration of speed and thereafter pull on the pull ring to simulate the ejection of a canopy. Immediately thereafter, the trainee would draw back his feet so that his heels actuate heel pad switches to indicate that his feet are in proper position for ejection while also placing his head in a proper position to actuate the head switch to indicate that his head is in a proper position for ejection. Finally, the trainee would actuate the means for propelling the seat, for example by pulling on a pull ring located on the seat.

Once the above sequence of operation has been carried out, the seat can be ejected in the usual fashion by being catapulted along the tower track means.

In the event that there is an accident during ejection, when the seat has been returned down the track means into the cockpit, appropriate personnel can release and move the cockpit away from the tower support so as to provide ready access to the trainee. If the trainee has to be removed, for example, by way of a gurney, the task can be more readily performed rather than attempting to lift the trainee out of the cockpit.

In the event that it becomes necessary to change the seat, the cockpit may be readily moved away from the tower support so that the seat can be changed or repaired.

These and other objects and advantages of the invention will become more apparent from the following detailed description taken in conjunction with the accompanying drawings wherein:

FIG. 2 illustrates a perspective view of the inside of a cockpit in accordance with the invention;

FIG. 3 illustrates a side view of the simulator after the seat and an occupant have been returned to a rest position;

FIG. 4 illustrates a view similar to FIG. 3 with the cockpit moved away from the tower support;

FIG. 5 illustrates a plan view of a releasable means for securing the movable cockpit to the tower support; and FIG. 6 illustrates a block diagram of the various means for simulating a sequence of procedures for ejecting a seat from a cockpit in accordance with the invention.

Figure 1:
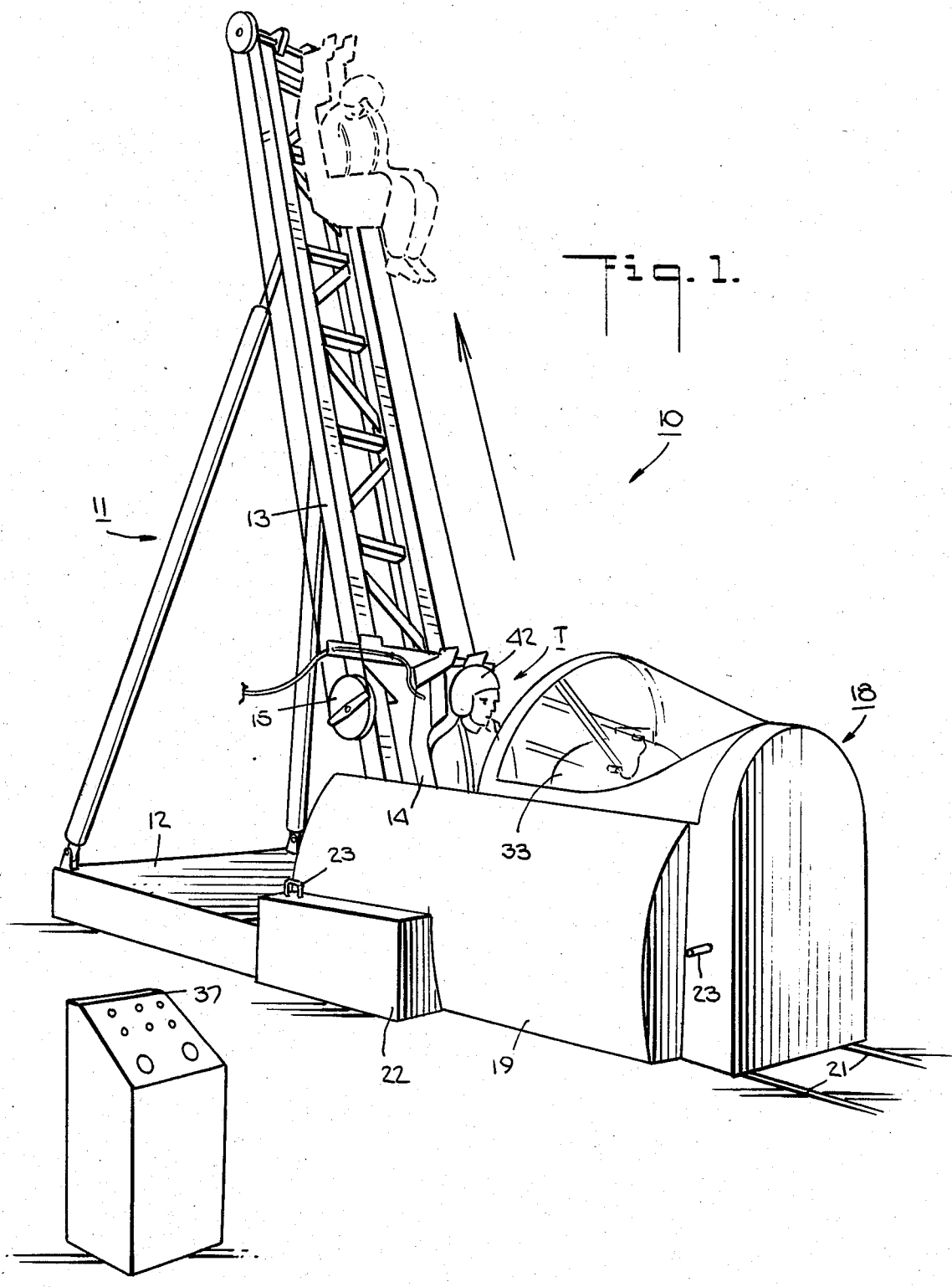
FIG. 1 illustrates a perspective view of an ejection seat simulator constructed in accordance with the invention.

Referring to FIG. 1, the ejection seat simulator 10 comprises a tower 11 which is of generally known construction and which includes a fixed support 12 and track means 13 which extend upwardly from the support 12 at an angle. In this regard, the track means 13 is of generally known construction and need not be further described.

The simulator 10 also has a seat 14 movably mounted on the track means 13 in known manner for movement therealong. In this regard, the seat may be connected to a suitable descent control means such as a cable arrangement 15 which can be used to move the seat from a raised positoin as indicated in dotted line in FIG. 1 to a lowered rest position as shown in full line in FIG. 1. This cable arrangement 15 is also of known construction and need not be further described.

The simulator 10 also has suitable catapult means 17 (see FIG. 4) for propelling the seat 14 along the track means 13. In this regard, any suitable propelling means such as a pneumatic catapult system may be used to catapult the seat 14 along the track means 13 from the lowered rest position of FIG. 1 to the elevated position indicated in FIG. 1.

Referring to FIGS. 1, 3 and 4, the simulator 10 also has a cockpit 18 which is releasably secured to the support 12. As indicated, the cockpit 18 has a shell-like housing 19 which is mounted via rollers 20 on a pair of rails 21, for example which are embedded in a concrete floor so that the cockpit 18 can be moved between a first position adjacent the support and enveloping the seat 14 as indicated in FIG. 3 and a second position spaced from the support 12 and the seat 14 to provide access to the seat 14 as indicated in FIG. 4. The housing 19 also has a box-like structure 22 extending from each side at the rear end.

The shell-like housing 19 may be made of any suitable material, such as aluminum, and of a weight, e.g. about 160 pounds, suitable to be readily moved along the rails 21. To this end, the housing 19 may be provided with handles 23 at several places including on the box-like structures 22 and at the front of the housing 19 to facilitate manual movement by attending personnel.

Referring to FIG. 5, in order to secure the cockpit 18 to the support 12, a pair of releasable means 24 are provided. For example, each releasable means 24 is in the form of an over-center type quick release latch which includes a hook 25 fixed on the support 12 and a releasable latch 26 which is able to engage the hook 25. Each latch 26 is formed of a pair of arms 27, 28 which are pivotally articulated to each other with one arm 27 pivotally mounted on the floor of the cockpit 18 via a bracket 29 while the other arm 28 is free to engage the hook 25. As indicated, the arms 27, 28 can be depressed into a flattened horizontal position so as to lock the latch 26 to the hook 25. The nature of the releasable means 24 is such that a quick-release can be manually obtained should it become necessary to quickly move the cockpit 18 away from the support 12 to gain access to a trainee T seated in the seat 14.

In addition, a pair of alignment pins 30 are provided on the sides of the support 12 in facing relation to the box-like structures 22 of the housing 19 so as to be slidably received within suitable openings within the structures 22.

Referring to FIG. 2, the cockpit 18 is provided with suitable means for simulating a sequence of ejection procedures. Such means may include a dummy throttle 31 located on an inside side wall of the cockpit housing 19, for example to the left of the seat 14. This throttle 31 is mounted so that upon pulling back, a deceleration of speed can be simulated with a signal indicative of such being generated. In addition, a pull ring 32 can be mounted on a front panel 33 within the cockpit 18 to simulate a canopy release. For example, by pulling on the pull ring 32 the ejection of a canopy (not shown) can be simulated with a signal indicative of such being generated.

Suitable means are also mounted at the seat 14 for actuating the catapult means 17 upon completion of a certain sequence of ejection procedures. These means may include a pair of heel pad switches 34 (see FIG. 4) which are mounted on the floor of the cockpit to be actuated when the trainee T pulls in his feet against the switches 34 and a head switch 35 at the upper end of the seat 14 against which the trainee T may place his head to indicate that the trainee T is in position for ejection.

Additional means may also be provided on the seat, for example in the form of a pull ring 36 positioned in the middle of the seat 14 (see FIG. 2) so as to be located between the legs of the trainee T. When pulled, this pull ring 36 can be used to actuate the catapulting means 17 so that the seat 14 can be ejected upwardly along the track means 13.

Referring to FIG. 1, a suitable electrical control panel 37 is positioned in spaced relation to the tower 11 and cockpit 18 for use by an instructor. As shown in FIG. 6, this panel 37 is connected via suitable electrical lines 38, 39 to the throttle 31, pull ring 32 and heel pad switches 34 in the cockpit and the head switch 35 and pull ring 36 on the seat 14 in order to receive signals therefrom. Likewise, the panel 37 is connected to the catapult means 17 in order to actuate the catapult means 17 in response to the proper sequential reception of signals from the cockpit 18 and seat 14. For example, a suitable initiation switch 40 is located on the panel 37 so that an instructor can actuate a signal means such as a start lamp 41 on the panel 33 of the cockpit 18 to signal a trainee to begin an ejection procedure. Suitable circuit means connect the dummy throttle 31 in the cockpit 18 with a circuit in the panel 37 to deliver a signal thereto and to complete a circuit through an indicating lamp 31a to indicate that the throttle 31 has been pulled back. A similar circuit is connected to the pull ring 32 in the cockpit 18 to complete a circuit through an indicating light 32a on the panel 37 to indicate that the pull ring 32 has been sufficiently pulled to effect a canopy jettison. Likewise, suitable circuits can be connected with each heel pad switch 34 and the head switch 35 to deliver signals to the panel 37 for lighting corresponding indicating lamps 34a, 35a on the panel 37. Of note, a pair of head switches (not shown) can be used to more accurately position the head of a trainee. In this case, a pair of circuits are provided, one for each switch. Again, suitable indicating lamps are provided to indicate when the switches have been closed.

The control panel 37 also has a suitable circuit connected with a circuit to the pull ring 36 to receive a signal therefrom for lighting a lamp 36a on the panel 37.

Should all of the circuits and corresponding lamps be actuated and in proper sequence, the catapult means 17 is then actuated via the control panel 37 directly from the pull ring 36.

A suitable instructor operated safety switch 42 may also be provided on the panel 37 as an override so as to preclude ejection should the various switch circuits not be activated in the proper sequence or should some other reason so dictate.

In use, a trainee T is seated on the seat 14 with the cockpit 18 secured to the support 12 of the tower 11. When the starting lamp 41 lights on the panel 33 of the cockpit 18 the trainee T then carries out the following sequence of ejection procedures. First, the throttle 31 is pulled back and thereafter the pull ring 32 on the panel 33 is pulled away from the panel 33. Next, the trainee T pulls his feet back to actuate the heel pad switches 34 while also pulling back his head to actuate the head switch 35. As indicated in FIG. 1, the trainee T would be wearing a helmet 42 which would be used to actuate the head switch 35.

With the above four steps performed, the trainee T pulls up on the pull ring 36 located in the middle of the seat 14. At this time, the catapult means 17 is actuated via the control panel 37. The seat 14 and trainee would then be ejected towards the position indicated in dotted line in FIG. 1. Thereafter, seat 14 would be lowered via the cable arrangement 15 to the rest position as indicated in full lines FIG. 1.

In the event of a need to remove the trainee T, for example in the case of an accident, the two latches 24 are quickly released by suitable personnel and the cockpit 18 quickly rolled away along the tracks 21 from the seat 14 so that the trainee T can be more easily removed. Of note, the electrical line 39 between the panel 37 and cockpit 18 is of sufficient length to accomodate the movements of the cockpit 18.

The invention thus provides an ejection seat simulator which can be readily used for the training of pilots in ejection procedures. Further, the invention provides an ejection seat simulator wherein a cockpit can be quickly moved away from a seat so as to provide access to a trainee in the case of an accident.

As an alternative, the cockpit 18 may be pivotally mounted about a suitable horizontally disposed pivot axle or axles located at a lower portion of the front end or about a suitable vertically disposed axle at a rear position or corner of the cockpit 18 adjacent the tower 11 so that the cockpit 18 can be pivoted away from the seat 14. In either event, should the seat 14 require repair or replacement, the cockpit 18 can be readily moved away from the support 12 so that adequate access space can be provided for maintenance personnel. Likewise, should a cockpit of different configuration be desired it can be readily substituted in place of the extant unit.

What is claimed is:

1. An ejection seat simulator comprising
   a tower having a support and track means extending upwardly from said support;
   a seat movably mounted on said track means for movement therealong;
   first means for propelling said seat along said track means;
   a cockpit releasably connected to said support, said cockpit being movable between a first position adjacent said support and enveloping said seat and a second position spaced from said support and said seat to provide access space to said seat;
   second means in said cockpit for simulating a sequence of ejection procedures;
   third means at said seat for actuating said first means upon completion of said sequence; and
   an electrical control panel connected to said second means and said third means to receive signals therefrom, said panel being connected to said first means to actuate said first means in response to reception of said signals from said second means and said third means.

2. An ejection seat simulator as set forth in claim 1 wherein said second means includes a dummy throttle for simulating a deceleration of speed and a pull ring for simulating an ejection of a canopy.

3. An ejection seat simulator as set forth in claim 2 which further comprises a signal means in said cockpit for indicating a starting time for said sequence of procedures.

4. An ejection seat simulator as set forth in claim 1 which further comprises a pair of alignment pins on said support and a pair of openings in said cockpit for slidably receiving said pins.

5. An ejection seat simulator as set forth in claim 1 which further comprises at least one upstanding hook on said support and a releasable latch on said cockpit for releasably engaging said hook.

6. An ejection seat simulator as set forth in claim 1 which further comprises a pair of tracks extending from said tower with said cockpit movably mounted thereon.

7. An ejection seat simulator as set forth in claim 1 wherein said cockpit is pivotally mounted at an end remote from said tower to pivot between said first position and said second position.

8. An ejection seat simulator as set forth in claim 1 wherein said cockpit includes a plurality of handles thereon for manual movement of said cockpit between said first and said second positions.

9. An ejection seat simulator as set forth in claim 1 wherein said cockpit is pivotally mounted at an end adjacent said tower about a vertically disposed axle adjacent said tower to pivot between said first position and said second position.

10. An ejection seat simulator comprising
a tower having a support and track means extending upwardly from said support;
a seat movably mounted on said track means for movement therealong;
first means for propelling said seat along said track means;
a cockpit releasably connected to said support, said cockpit being movable between a first position adjacent said support and enveloping said seat and a second position spaced from said support and said seat to provide access space to said seat;
a pair of alignment pins on said support and a pair of openings in said cockpit for slidably receiving said pins;
at least one upstanding hook on said support and a releasable latch on said cockpit for releasably engaging said hook;
second means in said cockpit for simulating a sequence of ejection procedures;
third means at said seat for actuating said first means upon completion of said sequence; and
an electrical control panel connected to said second means and said third means to receive signals therefrom, said panel being connected to said first means to actuate said first means in response to reception of said signals from said second means and said third means.

11. An ejection seat simulator as set forth in claim 10 wherein said cockpit includes a plurality of handles thereon for manual movement of said cockpit between said first and said second positions.

* * * * *